3,147,296
REACTION OF ISOCYANATES AND BORANES AND PRODUCTS THEREOF
Marvin M. Fein, Westfield, and Michael Israel, Morristown, N.J., assignors, by mesne assignments, to Thiokol Chemical Corporation, a corporation of Delaware
No Drawing. Filed Oct. 15, 1957, Ser. No. 690,406
8 Claims. (Cl. 260—453)

This invention relates to solid reaction products of isocyanates and boranes.

The solid products of this invention when incorporated with suitable oxidizers, such as ammonium perchlorate, potassium perchlorate, sodium perchlorate, ammonium nitrate and etc., yield solid propellants suitable for rocket power plants and other jet propelled devices. Such propellants burn with high flame speeds, have high heats of combustion and are of the high specific impulse type. Probably the single most important factor in determining the performance of a propellant charge is the specific impulse, and appreciable increases in performance will result from the use of the higher specific impulse materials. The products of this invention when incorporated with oxidizers are capable of being formed into a wide variety of grains, tablets and shapes, all with desirable mechanical and chemical properties. Propellants produced by the methods described in this application burn uniformly without disintegration when ignited by conventional means, such as the pyrotechnic type igniter, and are mechanically strong enough to withstand ordinary handling.

The solid reaction products of this invention are prepared by reacting a borane with an isocyanate of the general formula

in which R is hydrogen, a lower alkyl, a lower alkenyl, a cycloalkyl or an aromatic radical, or a diisocyanate of the general formula

in which R' is a lower alkylene, a cycloalkyl or an aromatic radical.

Suitable boranes include tetraborane, pentaborane, decaborane, lower alkyl pentaboranes in which the alkyl groups contain 1 to 5 carbon atoms and lower alkyl decaboranes in which the alkyl groups contain 1 to 5 carbon atoms. Lower alkyl pentaboranes can be prepared, for example, according to the method described in application Serial No. 540,142, filed October 12, 1955, of Altwicker et al., and now U.S. Patent 3,052,725. Lower alkyl decaboranes can be prepared, for example, according to the method described in application Serial No. 540,141, filed October 12, 1955, of Altwicker et al., and now U.S. Patent 3,109,030.

Suitable isocyanates include, for example, isocyanic acid, methyl isocyanate, ethyl isocyanate, propyl isocyanate, n-butylisocyanate, vinyl isocyanate, propenyl isocyanate, cyclohexyl isocyanate and phenyl isocyanate. Suitable diisocyanates include, for example, hexamethylene diisocyanate, cyclohexyl, diisocyanate, 2,4-tolylene diisocyanate, 1,5-naphthalene diisocyanate, 3,3'-bitolylene-4,4'-diisocyanate, diphenylmethane-4,4'-diisocyanate, and 3,3'-dimethyldiphenylmethane-4,4'-diisocyanate.

The ratio of reactants can be varied widely, generally being in the range of 0.05 to 20 moles of the borane per mole of isocyanate, preferably 0.5:1 to 3:1. The reaction temperature can vary from —20° C. to 200° C. and the pressure can vary from subatmospheric to several atmospheres. The reaction to go to completion generally requires from one-quarter to fifty hours depending upon the ratio of reactants, the particular reactants utilized, and the temperature and pressure employed.

Although the reaction will proceed in the absence of a solvent, best results are obtained, especially where solid reactants are employed, by carrying out the reaction in a solvent common for the reactants but inert with respect to the reactants. Such solvents include aliphatic hydrocarbon solvents such as n-pentane, hexane and heptane, aromatic hydrocarbon solvents such as benzene, toluene and xylene, cycloaliphatic solvents such as cyclohexane and methylcyclopentane and oxygenated organic solvents such as dioxane, ethyl acetate, and diisopropyl ether. The amount of solvent can vary widely but generally ranges up to about 70 times the weight of the reactants. When a solvent is employed, it is preferred to carry out the reaction at the reflux temperature of the solvent.

The process of the invention is illustrated in detail by the following examples which are to be considered not limitative.

*Example I*

A solution containing 17.4 g. (0.1 mole) of 2,4-tolylenediisocyanate and 12.2 g. (0.1 mole) of decaborane in 167 cc. of xylene was placed in a 300 cc. three-necked flask equipped with a stirrer, a thermometer, a reflux condenser and a metered gas outlet tube. The mixture was heated at 121° C. for 25 hours, during which time 0.07 liter of gas were evolved, and a yellow solid precipitated from solution. This solid weighed 9.0 g. and decomposed continuously above 200° C. without softening or melting by 300° C. The product was analyzed and found to contain 47.9 percent carbon, 5.8 percent hydrogen, 11.8 percent nitrogen, and 16.9 percent boron. Infrared spectrophotometric analysis revealed C—H, B—H, C=O, and B—O bonds.

*Example II*

A solution of 12.2 g. (0.1 mole) of decaborane in 75 cc. of benzene was added to a solution of 10 g. (0.1 mole) of n-butylisocyanate in 75 cc. of benzene and the mixture was heated at reflux for 19 hours. During this time, 1.6 g. of an orange powder precipitated and was filtered. Upon evaporation of the benzene filtrate, and trituration with hot heptane, another 3.1 g. of the same orange solid was obtained from the residue. The product was analyzed and found to contain 32.8 percent boron and 8.8 percent nitrogen. Infrared spectrophotometric analysis revealed C—H, B—H, C—O and B—O bonds. The product decomposed slowly above 225° C. without softening or melting and gave indications of being a polymeric material.

*Example III*

A solution of 4.5 g. (0.03 mole) of ethyldecaborane in 30 cc. of benzene was added to a solution of 5.0 g. (0.03 mole) of hexamethylene-diisocyanate in 35 cc. of benzene and the mixture was heated at reflux for 23 hours. During this time, 2.3 g. of a pale yellow boron-containing powder precipitated. This material started to decompose slowly at 160° C. and charred without softening above 200° C. the benzene solution was evaporated in a vacuum oven at 85°/2 mm. to yield 6.0 g. of a red rubbery boron-containing polymeric residue that hardened to a resin after three days.

The boron containing solid materials produced by practicing the methods of this invention, can be employed as ingredients of solid propellant compositions in accordance with general procedures which are well understood in the art, inasmuch as the solids produced are readily oxidized using conventional solid oxidizers such as ammonium perchlorate, potassium perchlorate, sodium perchlorate and the like. In formulating a solid propellant composition employing one of the materials produced in accordance with the present invention, generally from 10 to 35 parts by weight of boron containing material and from 65 to 90 by weight of oxidizer are present in the final propellant composition. In the propellant, the oxidizer and the product of the present process are formulated in intimate admixture with each other, as by finely dividing each of the materials separately and thereafter intimately mixing them. The purpose of doing this, as the art is well aware, is to provide proper burning characteristics of the final propellant. In addition to the oxidizer and the oxidizable material, the final propellant can also contain an artificial resin or polymer such as the polyurethan type, the function of the resin being to give the propellant mechanical strength and at the same time improve its burning characteristics. Thus, in manufacturing a suitable propellant, proper proportions of finely divided oxidizer and finely divided boron containing material can be admixed with a high solids content solution of a resin such as that mentioned previously or a pre-polymer of the resin, the proportions being such that the amount of resin is about 5 to 10 percent by weight based on the weight of oxidizer and boron compound. The ingredients are thoroughly mixed with the simultaneous removal of solvent, and following this the solvent free mixture is molded into the desired shape, as by extrusion. Thereafter the resin can be cured by resorting to heating at moderate temperatures. For further information concerning the formulation of solid propellant compositions, a reference is made to U.S. Patent 2,622,277 to Bonnell and U.S. Patent 2,646,596 to Thomas.

We claim:

1. A process for the preparation of solid reaction products of isocyanates and boranes which comprises reacting an isocyanate selected from the group consisting of isocyanates of the general formula $$R—N=C=O$$

in which R is a radical selected from the group consisting of hydrogen, lower alkyl, lower alkenyl, and cyclohexyl radicals and aryl hydrocarbon radicals containing one aromatic nucleus, and diisocyanates of the general formula $$O=C=N—R'—N=C=O$$

in which R' is a radical selected from the group consisting of lower alkylene radicals, cyclohexylene radicals and arylene hydrocarbon radicals containing from one to two aromatic nuclei, with a borane selected from the group consisting of tetraborane, pentaborane, decaborane, lower alkyl pentaboranes and lower alkyl decaboranes.

2. A process for the preparation of solid reaction products of isocyanates and boranes which comprises reacting from 0.05 to 20 moles of the borane per mole of isocyanate at a temperature of —20° C. to 200° C. in the presence of a solvent inert with respect to the reactants, the isocyanate being selected from the group consisting of isocyanates of the general formula $$R—N=C=O$$

in which R is a radical selected from the group consisting of hydrogen, lower alkyl, lower alkenyl, and cyclohexyl radicals and aryl hydrocarbon radicals containing one aromatic nucleus, and diisocyanates of the general formula $$O=C=N—R'—N=C=O$$

in which R' is a radical selected from the group consisting of lower alkylene radicals, cyclohexylene radicals and arylene hydrocarbon radicals containing from one to two aromatic nuclei, and the borane being a borane selected from the group consisting of tetraborane, pentaborane, decaborane, lower alkyl pentaboranes and lower alkyl decaboranes.

3. A process for the preparation of solid reaction products of isocyanates and decaborane which comprises reacting from 0.5 to 3 moles of decaborane per mole of isocyanate for from about one-quarter to fifty hours in the presence of benzene at a temperature of about 20°–85° C., the isocyanate being selected from the group consisting of isocyanates of the general formula $$R—N=C=O$$

in which R is a radical selected from the group consisting of hydrogen, lower alkyl, lower alkenyl, and cyclohexyl radicals and aryl hydrocarbon radicals containing one aromatic nucleus, and diisocyanates of the general formula $$O=C=N—R'—N=C=O$$

in which R' is a radical selected from the group consisting of lower alkylene radicals, cyclohexylene radicals and arylene hydrocarbon radicals containing from one to two aromatic nuclei.

4. The process of claim 3 in which the isocyanate is hexamethylene diisocyanate.

5. The process of claim 3 in which the isocyanate is n-butylisocyanate.

6. The product produced by the process of claim 1.

7. The product produced by the process of claim 4.

8. The product produced by the process of claim 5.

References Cited in the file of this patent

Schechter et al.: "Boron Hydrides and Related Compounds," January 8, 1951, Callery Chemical Co., page 37 (declassified January 5, 1954 per Bur. Aero.).